United States Patent [19]

Yuan et al.

[11] Patent Number: 5,622,679
[45] Date of Patent: Apr. 22, 1997

[54] EXTRACTION OF RARE EARTH ELEMENTS USING ALKYL PHOSPHINIC ACID OR SALT/TETRAALKYLAMMONIUM SALT AS EXTRACTANT

[75] Inventors: Chengye Yuan, Shanghai, China; Hengli Ma, Tucson, Ariz.

[73] Assignee: Cytec Technology Corp., Wilmington, Del.

[21] Appl. No.: 571,504

[22] Filed: Dec. 13, 1995

[51] Int. Cl.$^6$ .................................................. C01F 17/00
[52] U.S. Cl. ................................................................ 423/21.5
[58] Field of Search ............................. 423/21.5; 210/634

[56] References Cited

U.S. PATENT DOCUMENTS

| | | | |
|---|---|---|---|
| 3,276,849 | 10/1966 | Moore | 423/21.5 |
| 3,323,857 | 6/1967 | Bauer et al. | 423/21.5 |
| 3,575,687 | 4/1971 | Drobnick et al. | 423/21.5 |
| 4,647,438 | 3/1987 | Sabot et al. | 423/DIG. 14 |
| 5,015,447 | 5/1991 | Fulford et al. | 423/DIG. 14 |
| 5,338,520 | 8/1994 | Leveque et al. | 423/21.5 |

FOREIGN PATENT DOCUMENTS 967547  10/1982  U.S.S.R. ................................ 423/21.5

Primary Examiner—Steven Bos
Attorney, Agent, or Firm—Frank M. Van Riet

[57] ABSTRACT

A method whereby rare earth elements are extracted from acidic solutions thereof using, as an extractant, a mixture of an alkyl ($C_4$–$C_{12}$) phosphinic acid or salt and a tetraalkylammonium salt wherein the total number of carbon atoms in the four alkyl groups ranges from 14 to 56.

10 Claims, No Drawings

EXTRACTION OF RARE EARTH ELEMENTS USING ALKYL PHOSPHINIC ACID OR SALT/TETRAALKYLAMMONIUM SALT AS EXTRACTANT

BACKGROUND OF THE INVENTION

The separation of rare earth elements from solutions thereof wherein the elements are recovered together or from one another has become of more importance in recent years. Procedures for such recoveries have been the subject of various patents e.g. U.S. Pat. Nos. 4,647,438 and 5,015,447, which patents are incorporated herein by reference.

The procedures set forth in these patents are directed to the use of phosphine-containing extraction agents such as phosphoric acid, phosphonic acid, phosphinic acid, thiophosphinic acid and esters thereof. Additionally, phosphates such as tributyl phosphate and oxides such as trioctylphosphine oxide have been disclosed. These extractants are generally employed dissolved in a suitable organic diluent and have been shown to be especially effective when extracting rare earth elements from acidic solutions thereof. Rare earth elements are recognized as encompassing the lanthanide elements having an atomic number ranging from 57 to 71, inclusive, and yttrium whose atomic number is 39. Element 61, promethium, is, however, generally of less interest because of its radioactivity.

The general procedure employed for the separation of rare earth elements from solutions thereof, especially acidic solutions, is as follows, the feed solution generally resulting from treatment of a rare earth element containing ores such as monazite, bastnaesite, xenotime, bauxite and similar crude ores.

The feed stream of the rare earth in solution is treated in an extraction zone, and may be contacted counter-currently or co-currently, with the diluent solution of the extractant to form a raffinate and an extract. Ofttimes a neutralizing agent such as ammonia is also introduced into the feed stream to control pH. The raffinate is removed and the extract containing the extracted rare earth element(s) is usually sent to a scrubber wherein it is scrubbed with dilute acid and then sent to a stripper where it is stripped with more concentrated acid to separate the rare earth element(s). Hydrochloric acid is the preferred acid which the prior art procedures use to scrub and strip the extraction zone extract and mono-2-ethylhexyl phosphonic acid, mono-2-ethylhexyl ester is the most widely used acid extractant. Bis-(2,4,4-tri-methylpentyl) phosphinic acid is also used.

Although this method has found significantly wide acceptance in the recovery of rare earth elements, the procedure suffers from various deficiencies which, if overcome, would make the process even more commercially attractive.

One problem associated with the above-known process is that because the selectivity of the extractant employed is not as definitive as one would like, many stages of mixer-settlers are needed to achieve the desired separation. For example, some rare earth plants require 300 stages. This is in contrast to the four to eight stages required for copper recovery or the ten to twenty stages for cobalt/nickel separation. Additionally, the phosphonic acid extractant referred to above requires the use of concentrated acid for striping, e.g. 6N HCl. This results in high costs for neutralization of the excess acid and contamination of the final product by chloride ions. The chloride contamination has been overcome by the use of some prior art procedures. However, recovery of the final rare earth element(s) with $HNO_3$ is less productive and less desirable because of the properties of nitric acid.

Therefore, a procedure whereby the above-described problems and deficiencies could be overcome or substantially reduced would solve a long-felt need.

SUMMARY OF THE INVENTION

A method has now been found whereby the above-enumerated problems have been mollified. This method enables the recovery of rare earth elements from acidic solutions thereof and is extremely efficient in the separation of rare earth elements from one another, especially in the separation of the "heavy" rare earth elements i.e. those of atomic numbers 65–71, inclusive, more especially in the separation of ytterbium (Yb) from lutetium (Lu).

The method achieves a better separation of the rare earth element(s) in the extraction zone and in the scrubbing zone, especially for separating Yb from Lu and enables a less concentrated hydrochloric acid solution to be used in the stripper to strip the Lu from the extractant and, as a result, there results less of a need to neutralize the HCl, i.e., the high selectivity of the extractant of the instant invention selectively removes the Yb from the Lu in the scrubber thereby enabling excellent acid stripping action in the stripper.

DESCRIPTION OF THE INVENTION INCLUDING PREFERRED EMBODIMENTS

The instant invention resides in a method of recovering rare earth elements from acidic solutions containing the same which comprises 1) contacting said solution with an extractant comprising a mixture of:

a) a phosphorus compound having the formula

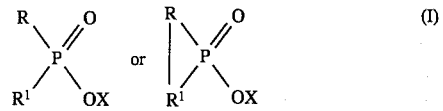

wherein R and $R^1$ are, individually, a substituted or unsubstituted, branched or straight chain alkyl group of 4 to 12 carbon atoms, inclusive, and X is hydrogen or a salt-forming radical, and b) a tetraalkylammonium salt wherein the alkyl groups are the same or different and the total number of carbon atoms in the four alkyl groups ranges from 14 to 56 and 2) recovering the extracted rare earth elements.

The ratio of the phosphorous compound to the tetralkylammonium salt ranges from about 3:1 to about 20:1, respectively, preferably from about 2:1 to about 15:1, respectively, and most preferably about 10:1, respectively.

The extraction temperature ranges from about 10° C. to about 50° C., preferably, from about 15° C. to about 40° C., most preferably, from about 20° C. to about 30° C. and the pH in the extraction zone should be acidic, i.e., under about 6.5, preferably from about 2 to 4.

The extractant mixture is optionally employed in conjunction with a diluent. Examples of useful diluents include the halogenated and non-halogenated aliphatic and/or aromatic hydrocarbons such as, for example, hexane, heptane, octane, dodecane, benzene, toluene, xylene, ethylbenzene, and petroleum cuts such as kerosene, fuel oil, JP-1 and the like.

The concentration of the extractant mixture in the diluent should range from about 5 to about 95%, by volume, preferably from about 10 to about 70%, by volume, and most preferably, from about 15% to about 50%, by volume.

Suitable phosphorous compounds having the formulae (I) set forth above include the following:

Di-n-butylphosphinic acid;
Di-isobutylphosphinic acid;
Di-n-pentylphosphinic acid;
Di-n-hexylphosphinic acid;
Di-n-heptylphosphinic acid;
Di-n-octylphosphinic acid;
Bis(2-ethylhexyl)phosphinic acid;
Di-n-nonylphosphinic acid;
Di-n-decylphosphinic acid;
Di-n-dodecylphosphinic acid;
Bis(2,4,4-trimethylpentyl)phosphinic acid;
(2,4,4-Trimethylpentyl)cyclohexylphosphinic acid;
(2,4,4-Trimethylpentyl)octylphosphinic acid;
Dicylcopentylphosphinic acid;
Dicyclohexylphosphinic acid;
Dicyclooctylphosphinic acid;
Cyclohexyl-n-butylphosphinic acid;
Cyclopentyl-n-dodecylphosphinic acid;
Cyclooctylethylphosphinic acid;
2,4,6-Triisopropyl-1,3,5,-dioxaphosphorinane-5-hydroxy-5-oxide phosphinic acid;
Cyclohexyl-1-hydroxycyclohexylphosphinic acid;
Bis(2-methyl-1-hydroxypentyl)phosphinic acid;
Cyclopentyl-1-hydroxycyclopentylphosphinic acid;
1-Methylpentyl-1-hydroxy-1-methylpentylphosphinic acid;
(1-Hydroxy-1-methylethyl)isopropylphosphinic acid and the like.

The alkyl groups may contain 4 to 12 carbon atoms, however, those of 6 to 10 carbon atoms are preferred. Preferably, X is hydrogen or an alkali metal or an ammonium ion. U.S. Pat. Nos. 4,348,367; 4,353,883 teach such phosphinic acids and salts and are hereby incorporated herein by reference.

The tetraalkylammonium salts of the extraction mixture used in the process of the instant invention are those where the total carbon atom content of the four alkyl groups ranges from 14 to 56 with no individual alkyl groups containing more than 18 carbon atoms. Preferable, are the tetraalkylammonium salts wherein at least one alkyl group is a methyl and most preferable are such salts wherein at least one alkyl group is methyl and the remaining alkyl groups contain 8 to 12 carbon atoms. The salts of component b) of the extractant mixtures are preferably the halides, e.g. chlorides, fluorides, bromides, etc.

Examples of suitable tetralkylammonium salts include methyltrioctylammonium chloride; methyltrinonylammonium chloride; methyltridodecylammonium chloride; methyltriisodecylammonium chloride; methyltriisooctylammonium bromide; methyltrioctylammonium iodide; tetrabutylammonium chloride; and the like.

As mentioned above, the instant process is applicable to the separation of all rare earth elements from acidic solution, however those of atomic numbers 39 and 65 to 71, inclusive, are preferred and those of atomic numbers 39 and 69–71 are most preferred.

It has also been found, in accordance with the scope of the present invention, that up to about 20%, by volume, of the extractant mixture of components a) and b), above, can be replaced by a third component c) having the formula

wherein $R^2$ and $R^3$ are the same or different, and are $C_6$–$C_{10}$ aryloxy groups or $C_4$–$C_{12}$ alkoxy groups and Z is oxygen or sulfur.

Exemplary compounds falling within the scope of Formula II, above, include:

Di(2-ethylhexyl)phosphoric Acid;
Di(2-ethylhexyl)thiophosphoric Acid;
Di(dodecyl)phosphoric Acid;
Di(dodecyl)thiophosphoric Acid;
Di(cyclohexyl)thiophosphoric Acid and the like.

The following examples are set forth for purposes of illustration only and are not to be construed as limitations on the present invention except as set forth in the appended claims. All parts and percentages are by weight unless otherwise specified.

Separation Factors

Batch shake-out tests are conducted by equilibrating equal volumes of the organic and aqueous phases (either 15 mL or 30 mL each) for 30 minutes at 25°±1° C. using a mechanical shaker. After phase separation, the rare earth concentration in the aqueous phase is determined by titration with EDTA. Equilibrium concentrations in the organic phases are calculated by mass balance and these results confirmed by stripping the loaded organics and analyzing the strip liquours; also by titration with EDTA.

The distribution coefficient (D) of a particular metal is defined as the ratio between its equilibrium concentrations in the organic and aqueous phases, i.e., $$D = \frac{\text{Equilibrium Concentration in Organic}}{\text{Equilibrium Concentration in Aqueous}}$$

The extraction constant, Kex, is a function of D but is independent of pH and may be used to calculate more reliable separation factors.

$$Kex = D \frac{[H^+]^3}{[(HL)_2]^3}$$

where:

$H^+$=Equilibrium concentration of hydrogen ions in the aqueous phase;

HL=Concentration of free extractant in the organic phase at equilibrium;

The separation factor, β, is then defined as $$\beta_2^1 = \frac{K^1 ex}{K^2 ex}$$

EXAMPLE 1

The following results are obtained with solvents 1M in bis(2,4,4-trimethylpentyl) phosphinic acid (BTPP) and 0.1M of a methyl trialkylammonium chloride where the hydrocarbon groups in the trialkylamine from which the compound is derived contain between 8 and 10 carbon atoms (MTAC) dissolved in dodecane. Its structure may be written as follows.

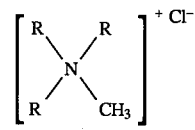

where R is a $C_8$–$C_{10}$ alkyl group.

Aqueous solutions used in the test are 0.02M in the rare earth chloride; either $Lu^{(3+)}$, $Yb^{(3+)}$, $Tm^{(3+)}$ or $Er^{(3+)}$. The total ionic strength is adjusted to 1M by the addition of sodium chloride. The data in Table 1 illustrate the enhancement in separation factors which is obtained by using a mixture of the extractants according to the present invention.

TABLE 1

| | Separation Factor (β) | | |
|---|---|---|---|
| | Lu/Yb | Yb/Tm | Tm/Er |
| BTPP | 1.45 | 2.06 | 3.44 |
| BTPP + MTAC | 2.14 | 2.40 | 3.18 |

EXAMPLE 2

The results of shake-out tests are shown in Table 2 and illustrate the ease with which rare earths are stripped from the mixture of MTAC and BTPP with relatively dilute HCl.

TABLE 2

| Stripping with Hydrochloric Acid | |
|---|---|
| Solvent: | 1M BTPP extractant, 0.1M MTAC in a mixture of dodecane and xylene (90/10 by volume respectively). The solvents are loaded to contain 0.1M Lu, Yb, Tm or Er. |
| Strip Solutions: | 0.5 to 2.0 N HCl |

Otherwise, the tests are carried out in accordance with the procedures described in Example 1.

| | % Stripped | | | |
|---|---|---|---|---|
| HCl Normality | Lu | Yb | Tm | Er |
| 0.5 | 70 | 75 | 95 | 96 |
| 1.0 | 87 | 94 | 100 | 100 |
| 2.0 | 98 | 99 | 100 | 100 |

EXAMPLE 3 (COMPARATIVE)

Chemically, the reagent of choice now used within the rare earth industry is mono-2-ethylhexylphosphonic acid, mono-2-ethylhexyl ester (MEPA). This is available commercially in China and is also manufactured in Japan and in the United States. The data shown in Table 3, below, illustrate the comparative difficulty with which ytterbium is stripped from MEPA with HCl. The experiments are carried out in accordance with the procedure of Example 2, above.

TABLE 3

| Yb Stripping from MEPA With HCl | |
|---|---|
| HCl Normality | % Yb Stripped |
| 0.5 | 1.77 |
| 1.0 | 11.6 |
| 2.0 | 35.1 |

EXAMPLES 4–7

The procedure of Example 1 is again followed except that BTPP is replaced by an equivalent amount of each of the phosphinic acid derivatives set forth below. In each instance, substantially equivalent results are achieved when used with MTAC.

Example 4—Di-n-octylphosphinic acid.
Example 5—Dicyclohexylphosphic acid.
Example 6—Bis(2-ethylhexyl) phosphinic acid.
Example 7—2,4,4-trimethylpentylcyclohexyl phosphinic acid.

Stripping results are equivalent to those shown in Example 2.

EXAMPLES 8–11

Again, following the procedure of Example 1 except that MTAC is replaced by the following trialkylmethyl ammonium derivatives, similar separation results are achieved.

Example 8—Methyl (trioctyl) ammonium bromide.
Example 9—Methyl (tridodecyl) ammonium chloride.
Example 10—Methyl (tridecyl) ammonium chloride.
Example 11—Methyl (trioctyl) ammonium iodide.
Example 12—Tetra-n-butyl ammonium chloride.

Again, stripping is similar in its efficacy to that shown in Example 2.

We claim:

1. A method of recovering a rare earth element from acidic solution which comprises 1) contacting said solution with an extractant comprising a mixture of:

a) a compound having the formula

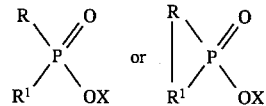

wherein R and $R^1$ are individually, a substituted or unsubstituted, branched or straight chain alkyl group of from 4 to 12 carbon atoms, inclusive, and X is hydrogen or a salt-forming radical and b) a tetraalkylammonium salt wherein the alkyl groups are the same or different and the total number of carbon atoms in the four alkyl groups ranges from 14 to 56 and 2) recovering the extracted rare earth element.

2. A method according to claim 1 wherein the extractant is employed in conjunction with a diluent.

3. A method according to claim 1 wherein the rare earth element is recovered from the extractant by acid stripping.

4. A method according to claim 1 wherein both R and $R^1$ are the same.

5. A method according to claim 4 wherein both R and $R^1$ are 2-ethylhexyl.

6. A method according to claim 4 wherein both R and $R^1$ are 2,4,4-trimethylpentyl.

7. A method according to claim 1 wherein at least one alkyl group of component b) is methyl.

8. A method according to claim 1 wherein one alkyl group of component b) is methyl and the remainder each contain 8–12 carbon atoms.

9. A method according to claim 6 wherein one alkyl group of component b) is methyl and the remainder each contain 8–12 carbon atoms.

10. A method according to claim 3 wherein the rare earth element phase is scrubbed with acid before stripping.

* * * * *